UNITED STATES PATENT OFFICE.

TOUSSAINT PIERRE BOSCHER, OF NEW ORLEANS, LOUISIANA.

COMPOUND FOR COATING WOOD, CORDAGE, &c.

SPECIFICATION forming part of Letters Patent No. 352,945, dated November 23, 1886.

Application filed July 28, 1886. Serial No. 209,339. (No specimens.)

*To all whom it may concern:*

Be it known that I, TOUSSAINT PIERRE BOSCHER, a citizen of the Republic of France, residing at New Orleans, in the parish of Orleans and State of Louisiana, have invented certain new and useful Improvements in a Composition for Coating for Wood, Metals, Plaster, Masonry, Electric Cables, Cordage, Ropes, Nets, Harness, Paper, Tarpaulins, and other Tissues, of which the following is a specification.

My composition consists of the following ingredients combined in the proportions stated: pure water, fifteen gallons; gas-tar, ten gallons; dead-oil, forty-five gallons; pine-tar, twenty gallons; naphtha, five gallons; chloride of ammonia, seventy pounds; bone-black, twenty pounds. These ingredients are to be thoroughly mingled by agitation.

In using the above-named composition the surface of the wood, metal, plaster, or other material desired to be coated should first be freed from dust, dirt, or other impurities. The coating is then placed upon the surface of the wood, metal, plaster, or other material, and can be placed thereon in the usual manner.

By the use of the above composition the surface of wood, metal, plaster, or other material is rendered elastic and water-proof, and the coating is durable.

I am aware that compositions containing gas-tar, pine-tar, tar-oil, and naphtha, in connection with other ingredients, have been used for the same purpose; but I am not aware that all of the ingredients of my composition in the proportions stated have been used together.

What I claim, and desire to secure by Letters Patent of the United States, is—

The herein-described composition of matter to be used for coating for wood, metals, plaster, masonry, electric cables, cordage, ropes, nets, harness, paper, tarpaulins, and other tissues, consisting of water, gas-tar, dead-oil, pine-tar, naphtha, chloride of ammonia, and bone-black, in the proportions specified.

In testimony whereof I affix my signature in presence of two witnesses.

TOUSSAINT PIERRE BOSCHER.

Witnesses:
GEORGE J. YENEWINE,
FRANK GERNON.